United States Patent
Wanderski et al.

(10) Patent No.: US 6,519,617 B1
(45) Date of Patent: Feb. 11, 2003

(54) AUTOMATED CREATION OF AN XML DIALECT AND DYNAMIC GENERATION OF A CORRESPONDING DTD

(75) Inventors: Michael C. Wanderski, Durham, NC (US); Ajamu A. Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/288,341

(22) Filed: Apr. 8, 1999

(51) Int. Cl.⁷ ............................................. G06F 15/00
(52) U.S. Cl. ..................... 707/513; 707/501.1; 707/500
(58) Field of Search ................. 707/513, 501, 707/500, 511, 523, 501.1

(56) References Cited

U.S. PATENT DOCUMENTS

| | | | |
|---|---|---|---|
| 6,006,242 A | * 12/1999 | Poole et al. ................. | 707/531 |
| 6,014,680 A | * 1/2000 | Sato et al. ................... | 707/513 |
| 6,023,714 A | * 2/2000 | Hill et al. .................... | 345/760 |
| 6,061,697 A | * 5/2000 | Nakao ........................ | 707/513 |
| 6,083,276 A | * 7/2000 | Davidson ........................ | 717/1 |
| 6,226,675 B1 | * 5/2001 | Meltzer et al. ............. | 709/223 |
| 6,253,366 B1 | * 6/2001 | Mutschler, III ................ | 717/1 |

OTHER PUBLICATIONS

Spyglass Prims, "Concepts and application", copyright 1997 Spyglass, Inc., pp. 1–8.*

Brickmore et al., "Digestor: device–independent access to the World Wide Web", copyright 1997, pp. 1075–1082.*

Hill et al., "A Virtual Document Interpreter for Reuse of Information", 1998, pp. 1–2.*

"Spyglass Prim 1.0", copyright 1997, Spyglass, Inc., pp. 1–2.*

* cited by examiner

*Primary Examiner*—Stephen S. Hong
*Assistant Examiner*—Thu V. Huynh
(74) *Attorney, Agent, or Firm*—Jeanine S. Ray-Yarletts; Marcia L. Doubet

(57) ABSTRACT

A method, system, and computer-readable code for translating an input document into an Extensible Markup Language (XML) dialect which is well-formed, such that automated, dynamically-selected transformations (such as those that will indicate a user's current context) can be applied to the document. The new XML dialect indicates dynamically-selected document transformations that are desired. Further, a novel technique is provided for dynamically generating a Document Type Definition (DTD) to describe the new XML dialect, so that the XML document created in this dialect can subsequently be processed by an XML parser. In the preferred embodiment, the desired transformations account for a user's dynamic context, and this information is represented by the dynamically-generated XML dialect.

21 Claims, 4 Drawing Sheets

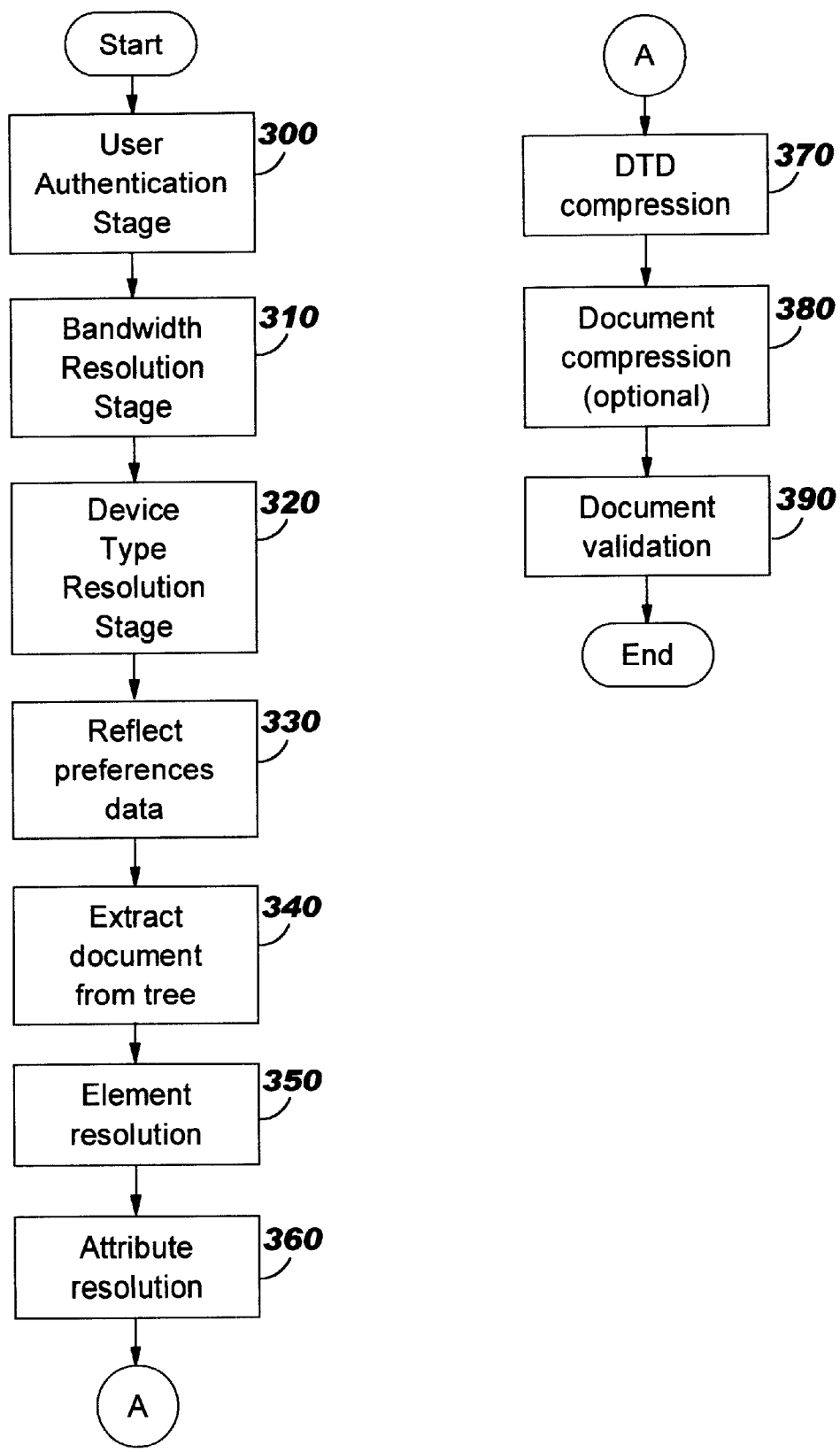

```
<?XML VERSION="1.0"?>
<DOCUMENT>
  <USER-CONTEXT>
    <USER>John Q. Public</USER> 420
    <DEVICE>PalmPilot</DEVICE> 430
    <NETWORK-BANDWIDTH>14.4</NETWORK-BANDWIDTH> 440

</USER-CONTEXT>
  ...
</DOCUMENT>
```

```
<?XML VERSION="1.0" STANDALONE="YES"?>
<DOCUMENT>
  ...
  <TABLE> 510
    <TABLE-ROW>...</TABLE-ROW>
    ...
  </TABLE> 515
  ...
  <INPUT TYPE="img" .../> 520
</DOCUMENT>
```

```
<?XML VERSION="1.0" STANDALONE="YES"?>
<DOCUMENT>
  ...
  <CONVERT-TABLE-TO-UNORDERED-LIST> 560
    <TABLE-ROW>...</TABLE-ROW>
    ...
  </CONVERT-TABLE-TO-UNORDERED-LIST> 565
  ...
  <RENDER-IMAGE-IN-GRAYSCALE ID="img" .../> 570
</DOCUMENT>
```

AUTOMATED CREATION OF AN XML DIALECT AND DYNAMIC GENERATION OF A CORRESPONDING DTD

RELATED INVENTIONS

IBM application Ser. No. 09/285,755 entitled "Applying Transformations to Legacy HTML Documents to Create Well-Formed Output" and Ser. No. 09/288,838 entitled "Achieving Complex Transformations with Dynamic Style Sheet Coalescing", filed concurrently herewith on Apr. 8, 1999.

BACKGROUND OF THE INVENTION

1. Field of the Invention

The present invention relates to a computer system, and deals more particularly with a method, system and computer-readable code for modifying a document to reflect transformations that are desired to account for dynamic factors such as a document user's current context (creating an Extensible Markup Language, or XML, dialect), and then dynamically generating a Document Type Definition (DTD) for this XML dialect.

2. Description of the Related Art

"DTD" is an acronym for "Document Type Definition". In general, a DTD is a definition of the structure of a document encoded in SGML ("Standard Generalized Markup Language") or an SGML derivative. SGML is an international standard for specifying document structure, which provides for a platform-independent specification of document content and formatting. An SGML derivative is a notation using a subset of the SGML notation. Examples of SGML derivatives are HTML ("HyperText Markup Language") and XML ("Extensible Markup e Language"). HTML is a subset of SGML that is directed toward document interchange on the World Wide Web (hereinafter, "Web"), and is considered the primary publishing language of the Web. XML is a simplified version of SGML, tailored to structured Web document content. (Refer to ISO 8879, "Standard Generalized Markup Language (SGML)", (1986) for more information on SGML; to "HTML 4.0 Specification, W3C Recommendation, revised on Apr. 24, 1998" which is available on the Web at http://www.w3.org/TR/1998/REC-htm140-19980424, for more information on HTML; and to "Extensible Markup Language (XML), W3C Recommendation Feb. 10, 1998" which is available on the Web at http://www.w3.org/TR/1998/REC-xml-19980210, hereinafter "XML Specification", for more information on XML.)

A DTD is written using SGML syntax. The DTD is encoded in a file which is intended to be processed, along with the file containing a particular document, by an SGML parser. The DTD tells the parser how to interpret the document which was created according to that DTD. DTDs may be used to describe any document type. For example, suppose a DTD has been created for documents of type "memo". Memos typically contain "To" and "From" information. The DTD would contain definitional elements for these items, telling the parser that these elements are valid syntax for this document type, as well as defining the syntax of subelements within these elements, etc.

HTML is a popular example of a notation for which an SGML DTD is defined. HTML is used for specifying the content and formatting of Web pages, where a software application commonly referred to as a "Web browser" processes the HTML DTD along with a Web page (i.e. a document encoded in HTML) in the same manner an SGML parser is used for other DTDs and document types. DTDs may also be used with documents encoded in XML. When a user wishes to print or display a document encoded according to an XML DTD, the software (i.e. the parser, compiler or other application) uses the XML DTD file to determine how to process the contents of the XML document.

HTML and XML are tag languages, where specially-designated constructs referred to as "tags" are used to delimit (or "mark up") information. In the general case, a tag is a keyword that identifies what the data is which is associated with the tag, and is typically composed of a character string enclosed in special characters. "Special characters" means characters other than letters and numbers, which are defined and reserved for use with tags. Special characters are used so that a parser processing the data stream will recognize that this a tag. A tag is normally inserted preceding its associated data: a corresponding tag may also be inserted following the data, to clearly identify where that data ends. As an example of using tags, the syntax "<p>" in HTML indicates the beginning of a paragraph. In XML, "<email>" could be used as a tag to indicate that the character string appearing in the data stream after this tag is to be treated as an e-mail address; the syntax "</email>" would then be inserted after the character string, to delimit where the e-mail character string ends.

XML is an "extensible" markup language in that it provides users the capability to define their own tags. This makes XML a very powerful language that enables users to easily define a data model, which may change from one document to another. When an application generates the tags (and corresponding data) for a document according to a particular XML data model and transmits that document to another application that also understands this data model, the XML notation functions as a conduit, enabling a smooth transfer of information from one application to the other. By parsing the tags of the data model from the received document, the receiving application can re-create the information for display, printing, or other processing, as the generating application intended it. Conversely, HTML uses a particular set of predefined tags, and is therefore not a user-extensible language.

XML is a well-formed notation, meaning that all opening tags have corresponding closing tags (with the exception of a special "empty" tag, which is both opened and closed by a single tag, such as "<email/>"), and each tag that nests within another tag is closed before the outer tag is closed. HTML, on the other hand, is not a well-formed notation. Some HTML tags do not require closing tags, and nested tags are not required to follow the strict requirements as described for XML (that is, in HTML a tag may be opened within a first outer tag, and closed within a different outer tag).

A parser for SGML or an SGML derivative may create a Document Object Model (hereinafter, "DOM") tree representation of an input document during the parsing process. The Document Object Model is a language-independent application programming interface ("API") for use with documents specified in SGML or a derivative of SGML. In particular, DOM is intended for use with HTML and XML. DOM is published as a Recommendation of the World Wide Web Consortium, titled "Document Object Model (DOM) Level 1 Specification, Version 1.0" (1998) and available on the World Wide Web at http://www.w3.org/TR/REC-DOM-Level-1.

The DOM API enables application programs to access a tree-oriented abstraction of a document. It is this tree-oriented form that is created from the XML document by an XML parser. An application program can manipulate document structure and contents (that is, by changing, deleting, and/or adding elements in the DOM tree). Further, the DOM enables navigating the structure of the document by navigating the corresponding tree. While the term "document" is used herein when discussing XML (and the corresponding DOM trees), it is to be understood that the information represented using XML may represent any type of information, and is not limited to the traditional interpretation of the word "document". For example, XML may be used to represent the layout of records in a data repository, the layout of a user interface for an application program, or the data to be used with a program or to be used as the values of records in a repository. For ease of reference, the term "document" will be used herein to refer to these diverse types of information. "DOM tree" refers to the logical structure with which a document is modeled using the DOM. A DOM tree is a hierarchical representation of the document structure and contents. Each valid DOM tree has a root node and one or more leaf nodes, with zero or more intermediate nodes, using the terminology for tree structures that is commonly known in the computer programming art. A node's predecessor node in the tree is called a "parent" and nodes below a given node in the tree are called "child" nodes.

When an XML parser processes an input document, it reads the document and constructs a DOM tree based on the syntax of the tags embedded in the document and the interrelationships between those tags. The tag syntax is stored in the nodes of the DOM tree, and the shape of the tree is determined from the tag relationships. The DOM specification is defined to provide "structural isomorphism"—that is, any XML parser that parses a given XML input document will create an identical DOM tree.

Due to the well-formed nature of XML documents, their corresponding DOM trees will also be well-formed. When HTML documents are not well-formed, however, DOM trees cannot be generated. Instead, a tedious manual translation of the source document must first be applied, where invalid syntax is located and corrected. One type of further processing that is desirable is to transform an input document to account for a particular document user's context. By transforming a document for a specific user context, the document can be optimized for its intended user. User context information may include user-related preferences as well as various limitations, such as: who this user is; what type of network connection he is currently using (e.g. whether his connection may be limited in bandwidth); and what type of device and browser the user is currently using. As is evident from these types of factors, a user's context may vary from one user to another, and may also vary for a single user over time. Accordingly, the desired transformations to optimize a document for a user's context will also vary dynamically. As an example of a context-specific transform, suppose the user requests downloading of a Web page which embeds very large image or video files. Further suppose that the user is currently connected to a server over a limited-bandwidth connection. It would be desirable in this situation to transform the page before downloading it over the current connection, reducing the size of the embedded files (e.g. to reduce the time required for transmission). If, however, the user is connected by a high-speed link, this type of transform might not be desirable. A further complicating factor in performing these types of dynamic transformations on a document represented by a DOM tree is that the particular transform processing that will be available to perform on a given document may not, in some cases, be easily determined in advance. For example, transform processing for particular context situations may be developed by different software vendors, so that one computing system may have different transforms available than are available in a different computing system. This unpredictability of available transforms, coupled with an HTML document that is not well-formed, prevents existing techniques from efficiently performing automated transformations on an input HTML document, such as transforming a document for a user context that varies dynamically (as described above).

Accordingly, a need exists for a technique with which well-formed documents can be automatically transformed using dynamically-selected transformations (such as those that will indicate a user's current context). The present invention provides a novel way to translate a well-formed dialect of XML into a dialect which indicates dynamically-selected document transformations that are desired. Further, the present invention provides a novel technique for dynamically generating a DTD to describe the new XML dialect, so that the XML document created in this dialect can subsequently be processed by an XML parser for the desired manner of presentation to the user.

SUMMARY OF THE INVENTION

An object of the present invention is to provide a technique whereby an XML document can be modified to indicate document transformations that are desired, creating a dynamically-generated XML dialect.

Yet another object of the present invention is to provide a technique for reflecting a user's current context in the XML dialect.

Still another object of the present invention is to provide a technique whereby a DTD is dynamically generated to describe the XML dialect, so that the XML document created in this dialect can subsequently be processed by an XML parser for the desired manner of presentation to the user in his particular context.

It is another object of the present invention to provide this XML dialect and DTD generation in a manner that adapts dynamically to a particular user's context.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented method, system, and computer-readable code for use in a computing environment for enabling efficient automated transformation of an input document to account for dynamic factors. This comprises: determining values of a set of dynamic factors; reflecting the values in a well-formed notation of the input document, such that a dynamically-generated dialect of the well-formed notation is created; and dynamically generating a Document Type Definition (DTD) to describe the dynamically-generated dialect. The well-formed notation and the dynamically-generated dialect may be Extensible Markup Language (XML) dialects. The dynamic factors may represent a user context, and this user context may comprise one or more of: one or more preferences of a user; a network connection of said user; a device type of said user; and a browser type of said user The dynamic generation of the DTD preferably further comprises: creating element declarations for each detected element in the dynamically-generated dialect; creating attribute declarations for each detected attribute in the dialect; and compacting said DTD. Compacting the DTD preferably further comprises: generating entity declarations to reduce a size of the dialect or of the DTD; generating parameter declarations to reduce the size of the DTD; and generating attribute defaults for the attribute declarations.

The present invention will now be described with reference to the following drawings, in which like reference numbers denote the same element throughout.

BRIEF DESCRIPTION OF THE DRAWINGS

FIG. 3 illustrates a flow chart which sets forth the logic involved with the preferred embodiment of the present invention;

FIG. 4 depicts an example syntax that may be used to specify values of dynamic factors; and FIGS. 5A and 5B illustrate how a document may be changed to request transformations that are dependent upon the dynamic factors.

DESCRIPTION OF THE PREFERRED EMBODIMENT

Figure 1:
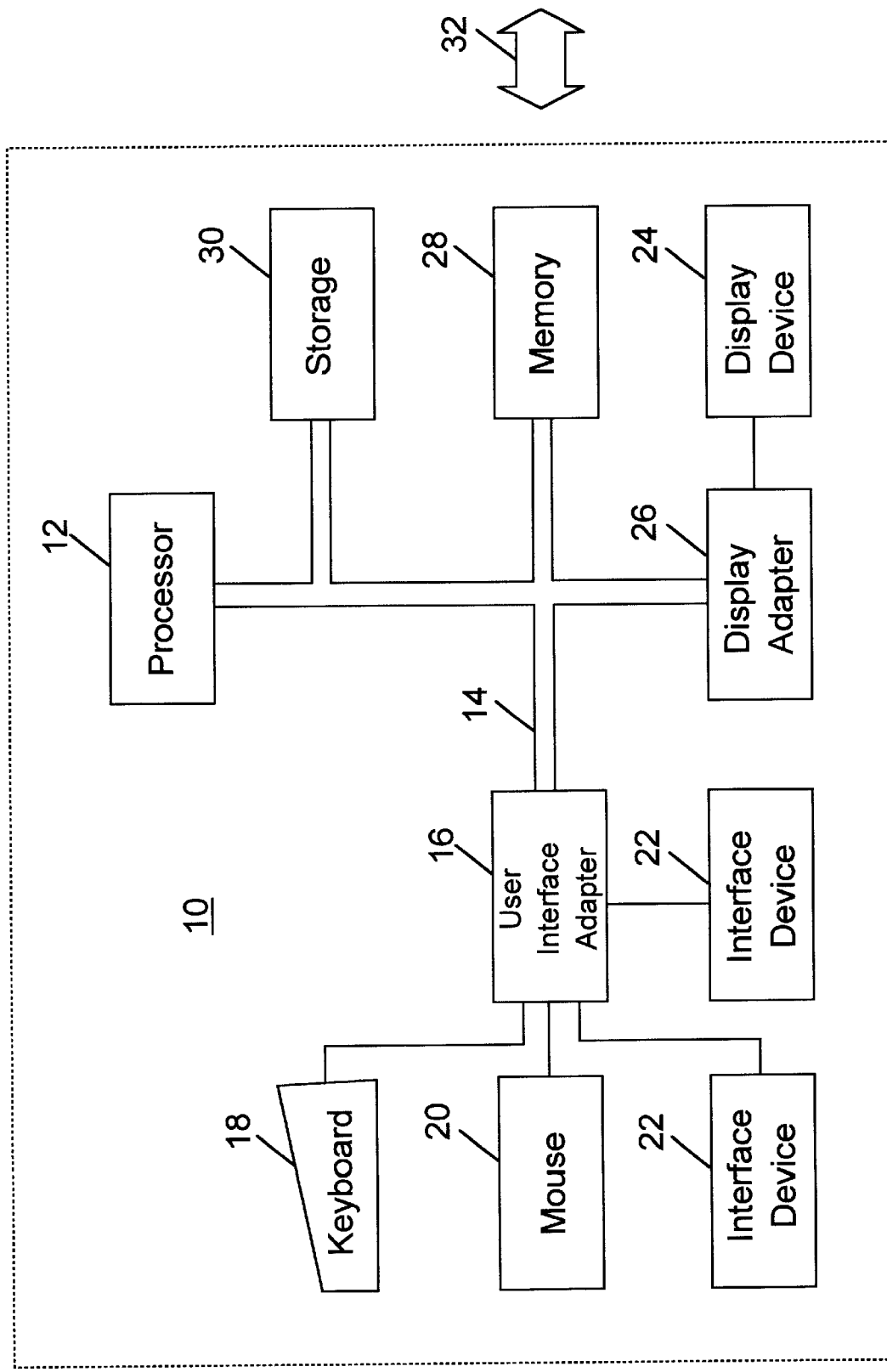
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
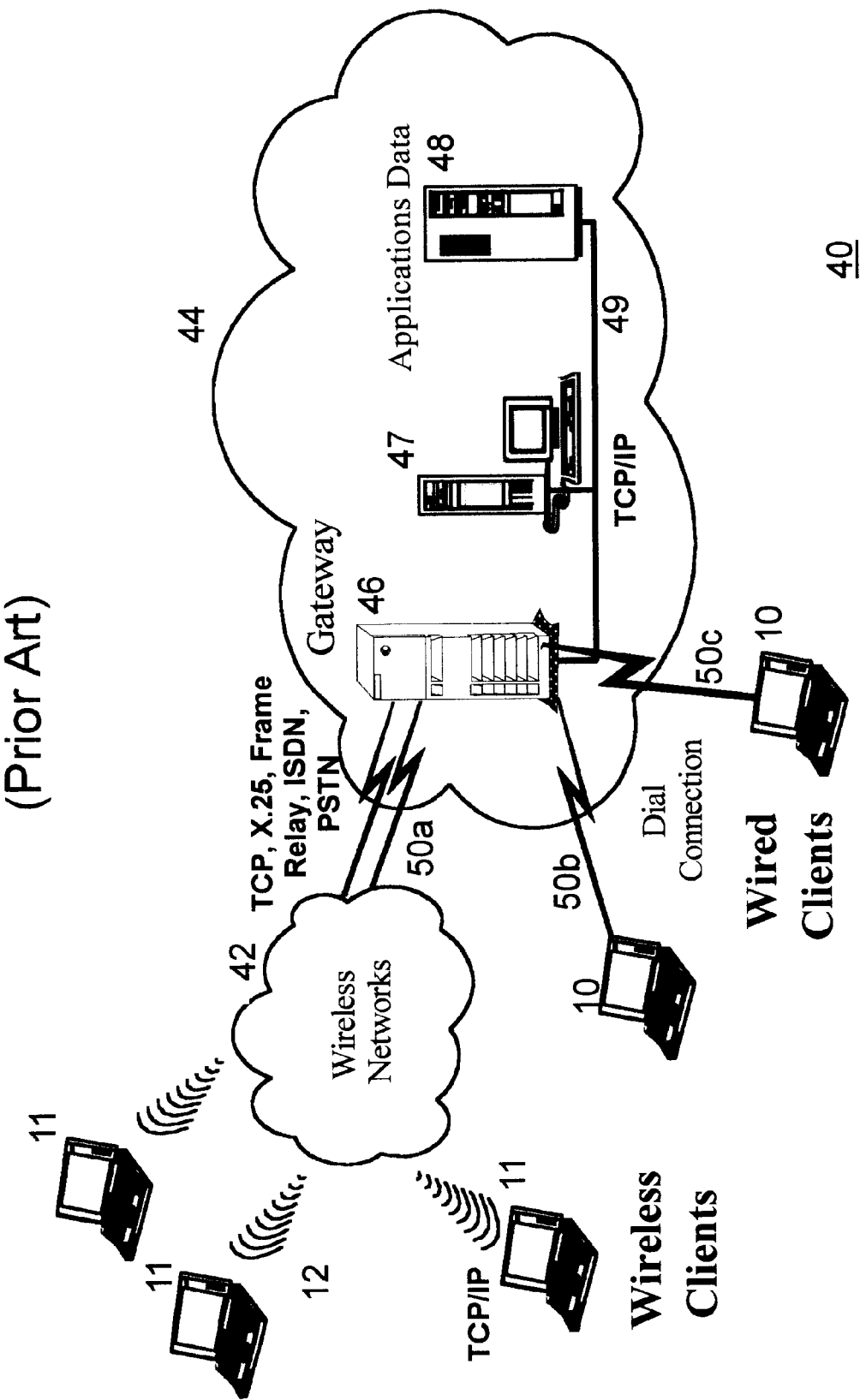
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X0.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing (and optionally communication) capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the present invention is implemented as one or more computer software programs. The software may operate on a server in a network, as one or more modules (also referred to as code subroutines, or "objects" in object-oriented programming) which are invoked upon request. Alternatively, the software may operate on a user's workstation. The server may be functioning as a Web server, where that Web server provides services in response to requests from a client connected through the Internet. Alternatively, the server may be in a corporate intranet or extranet of which the client's workstation is a component, or in any other network environment. While the preferred embodiment anticipates that the generated XML and DTD files are sent to a client over a network connection, the file content may also be transferred between computers via a storage media (such as diskette), without deviating from the inventive concepts disclosed herein.

Note that the word "file" is used in this disclosure to refer to stored data. This is for ease of reference only, and is not meant to imply any particular structure for storing the data, such as conventional "flat files". The data with which the present invention may be beneficially used may be stored in any number of ways without deviating from the inventive concepts disclosed herein, such as: a data element in a database, an object attribute in a directory entry, an object in flash memory, etc.

The present invention, along with the related inventions, enables an optimized modification of Web document content to accommodate dynamic factors such as a user's current context (such as device, browser, and network bandwidth limitations, as well as user preferences). Three system components are involved in this modification. The first is referred to herein as a "translation engine", and is the subject of the first related invention. The second component is referred to herein as a "DTD generation engine", and is the subject of the present invention. The third component is referred to herein as a "transformation engine", and is the subject of the second related invention. The translation engine translates HTML to well-formed XML. The DTD generation engine further modifies this XML document, so that it has tags that indicate desired transformations which account for values of dynamic factors. (Alternatively, the DTD generation engine may be used advantageously with XML documents which were not created by the translation engine, without deviating from the scope of the present invention.) This result is referred to herein as an XML dialect. In the preferred embodiment, these transformations reflect the user's current context. However, transformations having other motivations are also within the scope of the present invention. (For ease of reference, subsequent discussions related to translations and transformations that are to be reflected in the XML dialect will be in terms of reflecting the user's dynamic context information.) The DTD generation engine also automatically generates a DTD to express the syntax of the well-formed XML dialect. The output of the DTD generation engine may then be processed by the novel transformation engine techniques disclosed in the second related invention, completing the dynamically-selected transformation of the document in a highly efficient manner. (Alternatively, other automated transformations may be advantageously applied to the document in the well-formed XML dialect, using techniques other than those disclosed in the second related invention.)

The translation engine is typically invoked in response to a user requesting a particular HTML document. This request is issued by the user using techniques which are known in the art, and do not form part of the present invention. For example, the user may send an HTTP (HyperText Transfer Protocol) request from a client device to a server, specifying the URI (Uniform Resource Indicator) of an HTML document. In the preferred embodiment, the HTML document will be translated according to the first related invention, further modified according to the present invention to reflect dynamic factors (and a DTD will be generated), and transformed according to the second related invention, before returning a document file to the client. Alternatively, the translation, DTD generation, and transformation processes may operate on the client device in a proper environment, after the client receives the requested file. Or, the translation process and DTD generation process may operate on a server before sending the document to the client, and the transformation process may operate once the document has been received at the client. Alternatively, the translation process may operate on a server, and the DTD generation process and transformation process may operate once the document is received at the client. These alternative approaches to applying the translation and transformation processes are within the scope of the present invention.

In addition to providing a well-formed XML document, the elements in the XML output of the DTD generation engine relay a "transformation bias" that should be applied to the constructs of the input document by transformation processes of the transformation engine to account for the dynamic factors. That is, these XML elements specify dynamically-determined transformation "directives" (i.e. operations) that are desired to transform the input document. As an example of transforming a document to reflect user context, if the original HTML document input to the translation engine contains tags specifying a table, it may be desirable to convert the information in the table rows to unordered lists before presenting the document to the user. Or, the user may be connected to a server using a limited-bandwidth connection, in which case it may be desirable to convert any images embedded in the original HTML document to grayscale before sending the document file to the user (thus reducing the number of bytes that must be transmitted). As another example, the user's device may be a constrained-storage device. An example of this type of device is the IBM WorkPad, which is a handheld computer typically configured with several megabytes of storage, where that storage is provided as Random Access Memory RAM") to avoid the system overhead associated with other types of storage such as disk drives. ("WorkPad" is a registered trademark of IBM.) In this situation, it may be desirable to remove all images from the document, to increase the likelihood that sufficient storage space will be available on the user's device for receiving the requested document.

The translation of the input HTML document to a document in a well-formed XML, addition of dialect elements relaying transformation directives, and creation of a corresponding DTD is desirable for several reasons. First, the well-formed XML document can be parsed to yield a DOM tree which all XML-compliant parsers are capable of processing. Second, as discussed earlier, the code implementing transform processes that will be invoked by the transformation engine may be written by disparate sources, such as independent software vendors. A particular computing system may therefore have a different selection of transforms available. To support this operational model, it is imperative that the transforms are independent of one another. Independent transformations are not possible with non-well-formed documents, due to the presence of entangled document elements (i.e. tags). Third, the transformation engine operates to efficiently process the documents created by the DTD generation engine as "transformation scripts", in that these documents provide sufficient information to direct the transformation engine in its process of generating a document for presentation to the user (e.g. to account for his current context). Creation of a DTD for the XML dialect enables parsers to operate on an XML document with no advance knowledge of the syntax or semantics of the document, maximizing the portability of the document.

In the preferred embodiment, the present invention will be implemented in the Java programming language, and JavaBeans will be used to implement the transforms. ("Java" and "JavaBeans" are trademarks of Sun Microsystems, Inc.) A JavaBean is the Java term for a "component", where a component is a reusable building block of application logic that a programmer can combine with other components to form an application program.

The preferred embodiment of the present invention will now be discussed in more detail with reference to FIGS. 3 through 5.

FIG. 3 illustrates a flowchart of the logic that may be used to implement the preferred embodiment of the DTD generation engine of the present invention. Block 300 begins this process, operating upon a valid and well-formed DOM tree (which may have been created by the translation engine of the first related invention). This DOM tree will now be processed by Blocks 300 through 330 so that the nodes will represent transformation bias information. Blocks 300 through 330 describe determining transformation bias for specific factors in the user's context. Other types of dynamic information may be determined in addition to, or instead of, the factors described without deviating from the inventive concepts of the present invention. The output of this part of the DTD generation process is then dynamically-generated XML tags that suggest transformations that are desired. In the preferred embodiment, these transformations are intended to remedy applicable device, browser, or network limitations and to accommodate user preferences or limitations (such as preventing the user from downloading files for which he is not authorized) that are applicable for the current user. As stated earlier, the actual transformations are performed by the transformation engine which is the subject of the second related invention.

Block 300 determines the identity of the user. This may be done, for example, by issuing a message from the server using the Transport Layer Security (TLS) protocol to retrieve the user's name from the client machine. Preferably, an authentication process is then performed at the server for this user, using techniques which are known in the art. If the authentication process fails (or in the absence of authentication), a "default" user profile will preferably be used to supply user preferences and/or limitations. Otherwise, when the authorization process succeeds, any stored preferences and/or limitations for this authenticated user are then retrieved (for example, by querying a directory database where such user-related information is stored), again using techniques which are known in the art. As an example of user preferences, a particular user may have a preference for processing documents through a speech synthesizer. A transform that accommodates this preference might substitute audio files for text in a Web page. As an example of user limitations, users having a particular characteristic such as being members of a certain department or having a management classification may be authorized to receive more detailed information with a document than users not having that characteristic. These types of retrieved (or default) user information will be used by Block 330 (as further discussed below).

Block 310 determines any network-related limitations of the user's current connection. Limited bandwidth is one such limitation. Other types of limitations may also be determined, such as whether the user is connected over a wireless connection that is typically more expensive than a wireline connection (thus suggesting a preference for minimizing the number of bytes transmitted for the requested document). This network-related information is also used by Block 330.

Block 320 determines the type of device and browser the user is currently using. A number of techniques can be used to make this determination, the details of which do not form part of the present invention. For example, in a simple case, each user may always use one specific device and browser, and this information can be stored in a file that is accessed using the user's identification to retrieve the applicable device and browser. Or, in a more dynamic approach, the User-Agent field of the HTTP header of the document request may be parsed to retrieve the identification of the user's browser. This browser information can often be used to infer a device type. For example, if the user's browser is the Handweb 1.1 product (available from Smartcode Software, Inc.), it can be inferred that this browser is likely running on a PalmPilot or Palm III device.

Block 330 uses the limitation and preference information (or other dynamic factors, as appropriate) gathered by Blocks 300, 310, and 320 to determine a set of transforms that are desirable in view of these factors. In the preferred embodiment, these desired transforms are dynamically selected for this particular user at the time the current document request is being processed. (The transforms are subsequently applied by the transformation engine.) Because the user's context may vary over time, this approach enables the transforms to be specifically tailored to a dynamically-changing context. Block 330 preferably creates a <USER-CONTEXT> element (or other syntax, as appropriate) in the input document, with subelements such as <USER>, <DEVICE>, and <NETWORK-BANDWIDTH> to reflect each dynamic factor in the user's context. FIG. 4 depicts an example syntax that may be used to specify the dynamic factors and values thereof. This element insertion to reflect preference and/or limitation data in the DOM tree results in an XML dialect which is generated dynamically at run-time. As illustrated by the example document 400 in FIG. 4, the XML dialect now includes a <USER-CONTEXT> element 410; a <USER> element 420; a <DEVICE> element 430; and a <NETWORK-BANDWIDTH> element 440.

For example, suppose a <table> tag exists in the DOM tree, and further suppose that devices exist which cannot provide graphic indications of row and column separators. To accommodate this situation, a transform bean may be available that (when processed in the transformation engine) will translate all tables into unordered lists. If the user's device is determined to be of this type, Block 330 will modify the <table> tag to indicate that the transform-table-to-unordered-list transformation is desired in this context. As another example, the DOM tree may contain an <image> tag. If the user's network connection has limited bandwidth or is an expensive wireless connection, it may be desirable to reduce the number of bytes required for transmitting the image by reducing it to grayscale or even completely omitting it. The <image> tag will be modified by Block 330 to indicate the desired transformation. As is demonstrated by these examples, the limitation and preference information may not be relevant to each tag of the DOM tree, and the manner in which the information is used depends on the particular tag being processed. The beans invoked in Block 330 are written to translate, or modify, the tags in the DOM tree to request the transforms that are available in a particular computing environment (as determined in the transformation engine), and which are appropriate for the current context or other dynamic factors. Other types of context-dependent transforms may include: scaling images larger or smaller; converting embedded images to hypertext links to the image file (giving the user the option of whether to subsequently request the image); removing information such as sensitive material or comments from the document; inserting copyright information into the document; transforming the document to a specific content type (such as the MIME type text/xml); transforming the document with a particular DTD in mind (such as that used with the Wireless Markup Language when the user has a wireless connection); etc. The modified tags in the DOM tree that results from completion of Block 330 are then in a form that can subsequently be used as a transformation script by the transformation engine. (Note that the specific syntax that is used for the modified tags, with which a desired transform is indicated, does not form part of the present invention. Many alternative approaches to such a syntax are possible. For example, XML processing instructions could be leveraged to specify transformation directives.)

FIGS. 5A and 5B illustrate examples of how the tags of a document may be changed by Block 330 to request transformations that are dependent upon the values of the dynamic factors that are being reflected in the output document. The input document 500 in FIG. 5A contains a <table> tag 510, 515. As discussed in the previous paragraph, a transformation may be requested to change this table into an unordered list. A modified tag requesting this transformation is shown the input document 500. A modified tag which requests a transformation of this image to grayscale, as discussed above, is shown at 570 of the output document.

Blocks 340 through 370 dynamically generate a DTD that corresponds to the modified tags of the DOM tree. The tags in the DOM tree represent a dynamically-generated dialect of XML which represents the transformation directives to be applied (as previously stated). And, when the XML dialect was created by the translation engine, the tags also reflect the HTML constructs of the document requested by the client. The DTD will enable these tags to be processed independently and orthogonally by the transformation engine of the second related invention, without requiring the transformation engine to have advance knowledge of the complete DOM. (In the prior art where HTML documents are not well-formed, this type of automated transformation is not possible because each instance of ill-formed syntax must typically be manually detected and corrected.)

Block 340 extracts the document from the DOM tree, by traversing the tree nodes using techniques which are well known in the art. The resulting XML document is then parsed by Block 350 to resolve the complete set of elements which are present (including nested elements). According to the syntax of XML, element names appear following an opening angle bracket ("<" character) that is not immediately followed by a slash character ("/"). An element declaration entry is created in the DTD for each detected element. Each element declaration has the syntax <!ELEMENT element-name (subelement-1, subelement-2, . . . )> where the opening syntax "<!ELEMENT" is required XML syntax for declaring an element, "element-name" is the name of the element that was detected (i.e. the character string that followed the opening angle bracket in the document), and an optional list of subelements then follows in parentheses before the required ending syntax ">". For example, with reference to the newly-created element <USER-CONTEXT> element 410 in FIG. 4, an element declaration would be created as follows:

<!ELEMENT USER-CONTEXT (USER, DEVICE, NETWORK-BANDWIDTH)>

For elements that do not contain subelements, the reserved symbol EMPTY will be used as the declared content following the element name.

Block 360 then resolves the attributes which are present for each element. This comprises determining the attribute name, attribute type, and any attribute default that may be present. Attribute names are located when parsing the element tag. (As will be obvious to one of skill in the art, the processing of Block 360 may be intermingled with Block 350, in order to fully process each element as it is being parsed.) If a character string follows the element name within the tag, then this is an attribute for the element. When an attribute name is used within a tag, it will be followed by an equal sign ("=") and an attribute value that is specified within quotations. An attribute list entry is created in the DTD specifying the list of attributes and corresponding information (i.e. name, type, and any default) for each element of the document. The valid attribute types which may be generated for XML are discussed in the XML Specification. Each entry has the syntax <!ATTLIST element-name attribute-name attribute-type default>

One such entry may be created for each element, where the sequence (attribute name, type, default) is repeated for each attribute. Or, a separate entry may be created for each individual attribute, such that there is more than one attribute list declaration for a particular element. In the preferred embodiment, the attribute type will be set to the reserved symbol CDATA, with two exception cases. First, if an attribute is encountered which has the same name as an entity, it is assumed that this is an entity reference. Thus, the attribute type will be set to the reserved symbol ENTITY. Second, if an ID attribute is encountered, the attribute type will be set to the reserved symbol IDREF (or IDREFS, when a list of IDs is encountered). The attribute default is determined subsequently by Block 370, as explained in more detail below.

Block 370 then compacts the entries that have been generated for the DTD, in order to eliminate any redundancies caused by duplicate element specifications, and to move logicallyrelated information that may be physically separated in the DTD so that it is located together. This will typically be a multi-pass operation. Parameter and general entities will be generated to leverage text substitution. General entities are those that may be used within the DTD and the document, as is known in the art. General entity declarations may be leveraged as described by the novel techniques disclosed in commonly-assigned (IBM application Ser. No. 09/197,299), which is titled "Structured Document and Document Type Compression" and which defines techniques for performing string substitution to reduce the size of a document and/or a DTD.

Parameter entity substitution may also be performed, where appropriate, by Block 370. Parameter entities are those which can only be referenced within the DTD, as is known in the art. The parameter entity substitution process used in Block 370 leverages parameter entities to provide a textual substitution where tags that occur in multiple declarations can be compacted by creating a parameter entity declaration and reference to this declaration. For example, suppose an element declaration for element ABC declares the subelements DEF, GHI, and XYZ, and that an element declaration for element DX declares subelements DEF and XYZ. The duplication in these declarations can be compacted by generating a parameter declaration as follows:

<!ENTITY %A "DEF, XYZ"> where "A" is the name of the parameter and the quoted string declares what is to be substituted for subsequent references to that parameter. The element declarations are then compacted to use references to the generated parameter declarations. In this example, the declaration for element ABC would now specify its subelements as "%A;, GHI" instead of "DEF, GHI, XYZ" and the declaration for DX would specify simply "%A;".

The redundancy reduction contemplated by the preferred embodiment removes redundant information from element declarations and attribute declarations. For example, the element declaration and attribute list generation processes of Blocks 350 and 360 may create an independent element declaration or attribute list, respectively, for each node of the DOM tree. When a tag is used more than once in a document, it will appear in more than one node of the DOM tree. In the preferred embodiment where each node is processed as it is encountered, this will result in a separate declaration for each occurrence, leading to overlapping declarations and redundant information in the DTD. The compaction process of Block 370 searches for multiple declarations of an element, compacting the information into a single declaration. For example, suppose a first element declaration for an element named "<unordered-list>" declared subelements "unordered-list-bullet-font" and "unordered-list-content" while a subsequent declaration for the same element declared the subelements as "unordered-list-content" and "unordered-list-content-font". In the compacted declaration, the subelements would be declared as the union of the subelements detected on all the overlapping element declarations (in this example, "unordered-list-bullet-font", "unordered-list-content", and "unordered-list-content-font"). The same process may be applied for attribute list declarations, where a single compacted list is generated by determining the union of all attributes that are declared in attribute lists for a given element name.

In addition, element declarations are compressed utilizing the keyword "ANY" where possible. That is, if the subelements detected for an element include the special element "ANY", then this element will be used instead of individually specifying the subelements.

In the preferred embodiment, the attribute list declarations are modified to define a default attribute value. This comprises determining, for each attribute, which value occurred most often. This value is then specified in the attribute list declaration as the default (where the XML syntax specifies enclosing the default value in quotes), eliminating the need to specify the value in the document each time the value used is identical to this declared default.

Terseness of the DTD is important in order to avoid ambiguity and inaccuracies. Thus, the DTD compaction process of Block 370 is critical to the efficient, accurate parsing of the resulting document.

The XML document compression of Block 380 is optional. This compression comprises reducing the document size by applying compression techniques such as the novel techniques described in commonly-assigned (IBM application Ser. No. 09/197,299), which is titled "Structured Document and Document Type Compression". In addition, where an attribute value occurs for which Block 370 defined the value as being the default, the value can be removed from the document (because application of the DTD will supply this default value). The specific type of compression performed does not form part of the present invention. The compression process is preferably performed only for documents destined for devices connected over a relatively slow network link. Note that this processing may result in generating entity declarations to be appended to the DTD and/or the document. When updates are made to the DTD, the updating should be followed by re-invoking the DTD compaction of Block 370, which will then return control to Block 380. In the preferred embodiment, a counter will be used to limit the number of repetitions through these blocks to some small number, in order to avoid endless cycles. The logic for implementing this type of counter will be obvious to one of skill in the art, and is not shown in FIG. 3. (For example, the counter will be initialized to zero upon beginning the process of FIG. 3. It will be incremented upon reaching Block 380, and tested against some constant upper limit before attempting to return to Block 370.)

Block 390 validates the document and its DTD by applying the DTD to the XML document created by Block 330. This is an error-checking technique to ensure that the DTD accurately defines the generated XML dialect, and is not strictly required as part of the present invention.

The processing of FIG. 3 is then complete. The document and DTD generated by this DTD generation engine can now be transferred between computers and/or stored for later processing by a transformation engine such as that disclosed in the second related invention.

While the preferred embodiment of the present invention has been described, additional variations and modifications in that embodiment may occur to those skilled in the art once they learn of the basic inventive concepts. The techniques disclosed herein are based partially upon certain predefined characteristics of the notations being processed. It will be obvious to one of ordinary skill in the art that the inventive concepts disclosed herein may be adapted to changes in the notations, should they occur. Therefore, it is intended that the appended claims shall be construed to include both the preferred embodiment and all such variations and modifications as fall within the spirit and scope of the invention.

We claim:

1. In a computing environment, computer readable code readable by a computer system in said environment, for enabling efficient automated transformation of an input document to account for dynamic factors, comprising:

a subprocess for identifying an input document encoded in a well-formed notation, wherein said input document comprises (1) a plurality of elements conforming to a first Document Type Definition (DTD) and (2) a value for at least one of said elements;

a subprocess for programmatically determining current values for one or more factors, said factors representing dynamically-changeable information, wherein said factors are not represented by said plurality of elements in said input document;

a subprocess for programmatically generating, for each of said factors, an additional element representing said factor and programmatically including said current value of said factor as a value of said additional element;

a subprocess for programmatically inserting said additional elements and included values into said input document, thereby creating an output document which does not conform to said first DTD; and a subprocess for programmatically generating a second DTD from said output document, such that said output document does conform to said second DTD.

2. Computer readable code for enabling efficient automated transformation of an input document according to claim 1, wherein said well-formed notation is XML (Extensible Markup Language).

3. Computer readable code for enabling efficient automated transformation of an input document according to claim 1, wherein said output document is encoded in XML (Extensible Markup Language).

4. Computer readable code for enabling efficient automated transformation of an input document according to claim 1, wherein said factors represent a dynamically-changeable user context.

5. Computer readable code for enabling efficient automated transformation of an input document according to claim 4, wherein said dynamically-changeable user context comprises one or more of: one or more preferences of a user; a network connection of said user; a device type of said user; and a browser type of said user.

6. Computer readable code for enabling efficient automated transformation of an input document according to claim 1, wherein said subprocess for programmatically generating a second DTD further comprises:

a subprocess for programmatically creating element declarations for each detected element in said output document;

a subprocess for programmatically creating attribute declarations for each detected attribute in said output document; and a subprocess for programmatically compacting said second DTD.

7. Computer readable code for enabling efficient automated transformation of an input document according to claim 6, wherein said subprocess for programmatically compacting said second DTD further comprises one or more of:

a subprocess for generating entity declarations to reduce a size of said output document or a size of said second DTD;

a subprocess for generating parameter declarations to reduce said size of said second DTD; and a subprocess for generating attribute defaults for said attribute declarations.

8. A system for enabling efficient automated transformation of an input document to account for dynamic factors in a computing environment, comprising:

means for identifying an input document encoded in a well-formed notation, wherein said input document comprises (1) a plurality of elements conforming to a first Document Type Definition (DTD) and (2) a value for at least one of said elements;

means for programmatically determining current values for one or more factors, said factors representing dynamically-changeable information, wherein said factors are not represented by said plurality of elements in said input document;

means for programmatically generating, for each of said factors, an additional element representing said factor and programmatically including said current value of said factor as a value of said additional element;

means for programmatically inserting said additional elements and included values into said input document, thereby creating an output document which does not conform to said first DTD; and means for programmatically generating a second DTD from said output document, such that said output document does conform to said second DTD.

9. The system for enabling efficient automated transformation of an input document according to claim 8, wherein said well-formed notation is XML (Extensible Markup Language).

10. The system for enabling efficient automated transformation of an input document according to claim 8, wherein said output document is encoded in XML (Extensible Markup Language).

11. The system for enabling efficient automated transformation of an input document according to claim 8, wherein said factors represent a dynamically-changeable user context.

12. The system for enabling efficient automated transformation of an input document according to claim 11, wherein said dynamically-changeable user context comprises one or more of: one or more preferences of a user; a network connection of said user; a device type of said user; and a browser type of said user.

13. The system for enabling efficient automated transformation of an input document according to claim 8, wherein said means for programmatically generating a second DTD further comprises:

means for programmatically creating element declarations for each detected element in said output document;

means for programmatically creating attribute declarations for each detected attribute in said output document; and means for programmatically compacting said second DTD.

14. The system for enabling efficient automated transformation of an input document according to claim 13, wherein said means for programmatically compacting said second DTD further comprises one or more of:

means for generating entity declarations to reduce a size of said output document or a size of said second DTD;

means for generating parameter declarations to reduce said size of said second DTD; and means for generating attribute defaults for said attribute declarations.

15. A method for enabling efficient automated transformation of an input document to account for dynamic factors in a computing environment, comprising the steps of:

identifying an input document encoded in a well-formed notation, wherein said input document comprises (1) a plurality of elements conforming to a first Document Type Definition (DTD) and (2) a value for at least one of said elements;

means for programmatically determining current values for one or more factors, said factors representing dynamically-changeable information, wherein said factors are not represented by said plurality of elements in said input document;

means for programmatically generating, for each of said factors, an additional element representing said factor and programmatically including said current value of said factor as a value of said additional element;

means for programmatically inserting said additional elements and included values into said input document, thereby creating an output document which does not conform to said first DTD; and programmatically generating a second DTD from said output document, such that said output document does conform to said second DTD.

16. The method for enabling efficient automated transformation of an input document according to claim 15, wherein said well-formed notation is XML (Extensible Markup Language).

17. The method for enabling efficient automated transformation of an input document according to claim 15, wherein said output document is encoded in XML (Extensible Markup Language).

18. The method for enabling efficient automated transformation of an input document according to claim 15, wherein said factors represent a dynamically-changeable user context.

19. The method for enabling efficient automated transformation of an input document according to claim 18, wherein said dynamically-changeable user context comprises one or more of: one or more preferences of a user; a network connection of said user; a device type of said user; and a browser type of said user.

20. The method for enabling efficient automated transformation of an input document according to claim 15, wherein said programmatically generating a second DTD step further comprises the steps of:

programmatically creating element declarations for each detected element in said output document;

programmatically creating attribute declarations for each detected attribute in said output document; and programmatically compacting said second DTD.

21. The method for enabling efficient automated transformation of an input document according to claim 20, wherein said subprocess for programmatically compacting said second DTD further comprises steps of one or more of:

generating entity declarations to reduce a size of said output document or a size of said second DTD;

generating parameter declarations to reduce said size of said second DTD; and generating attribute defaults for said attribute declarations.

* * * * *